United States Patent
Han et al.

(10) Patent No.: US 9,960,405 B2
(45) Date of Patent: May 1, 2018

(54) SECONDARY BATTERY MODULE WITH A SHORT CIRCUIT CONNECTION MEMBER

(71) Applicant: Samsung SDI Co., Ltd., Yongin-si, Gyeonggi-do (KR)

(72) Inventors: Minyeol Han, Yongin-si (KR); Chiyoung Lee, Yongin-si (KR); Seokyoon Yoo, Yongin-si (KR); Hyungyu Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 895 days.

(21) Appl. No.: 14/282,871

(22) Filed: May 20, 2014

(65) Prior Publication Data
US 2015/0140373 A1   May 21, 2015

(30) Foreign Application Priority Data

Nov. 20, 2013   (KR) .................. 10-2013-0141791

(51) Int. Cl.
*H01M 2/34* (2006.01)
*H01M 2/20* (2006.01)

(52) U.S. Cl.
CPC ............ *H01M 2/345* (2013.01); *H01M 2/34* (2013.01); *H01M 2/206* (2013.01); *H01M 2200/103* (2013.01); *H01M 2200/20* (2013.01)

(58) Field of Classification Search
CPC . H01M 2/345; H01M 2200/30; H01M 10/445
See application file for complete search history.

(56) References Cited

U.S. PATENT DOCUMENTS

2007/0252556 A1* 11/2007 West ..................... H01M 2/202
320/116
2011/0039147 A1   2/2011 Cheon et al.
(Continued)

FOREIGN PATENT DOCUMENTS

KR   10-2011-0017778   2/2011
KR   2011-0076808 A    7/2011
(Continued)

OTHER PUBLICATIONS

KIPO Office action dated Jul. 20, 2016, for corresponding Korean Patent Application No. 10-2013-0141791 (6 pages).
(Continued)

*Primary Examiner* — Barbara L Gilliam
*Assistant Examiner* — Robert S Carrico
(74) *Attorney, Agent, or Firm* — Lewis Roca Rothgerber Christie LLP (57) ABSTRACT

A secondary battery module includes a plurality of secondary battery units each including at least one secondary battery, each secondary battery including an electrode assembly, a case accommodating the electrode assembly, and first and second electrode terminals electrically connected to the electrode assembly, wherein for at least the first secondary battery unit of the plurality of secondary battery units, each of the corresponding at least one secondary batteries further includes a short-circuit member electrically connected to the corresponding first electrode terminal and protruding to the outside of the case upon the internal pressure of the case reaching a high-pressure condition; at least one fuse connecting at least two of the plurality of secondary battery units to one another in series; and a short circuit connection member having a first side facing each of the short-circuit members of the at least one secondary battery of the first of the plurality of secondary battery units
(Continued)

and a second side electrically connected to a second electrode terminal of a secondary batter of another of the plurality of secondary battery units.

7 Claims, 5 Drawing Sheets

(56) References Cited

U.S. PATENT DOCUMENTS

| | | |
|---|---|---|
| 2011/0159350 A1 | 6/2011 | Ochi |
| 2012/0189884 A1 | 7/2012 | Guen et al. |
| 2012/0225333 A1 | 9/2012 | Kim |
| 2013/0189563 A1 | 7/2013 | Chang et al. |
| 2013/0252038 A1 | 9/2013 | Kim et al. |
| 2013/0316200 A1 | 11/2013 | Ochi |
| 2015/0111069 A1* | 4/2015 | Han .................... H01M 2/1252 |
| | | 429/7 |

FOREIGN PATENT DOCUMENTS

| | | |
|---|---|---|
| KR | 10-2012-0099167 | 9/2012 |
| KR | 10-2012-0099919 | 9/2012 |
| KR | 10-2013-0107854 | 10/2013 |

OTHER PUBLICATIONS

KIPO Notice of Allowance dated Apr. 4, 2017, for corresponding Korean Patent Application No. 10-2013-0141791 (2 pages).

* cited by examiner

SECONDARY BATTERY MODULE WITH A SHORT CIRCUIT CONNECTION MEMBER

CROSS-REFERENCE TO RELATED APPLICATION

This application claims priority to and the benefit of Korean Patent Application No. 10-2013-0141791, filed on Nov. 20, 2013, the entire content of which is incorporated herein by reference.

BACKGROUND

1. Field

Aspects of the present invention relate to a secondary battery module.

2. Description of the Related Art

A secondary battery module usually includes a plurality of secondary batteries connected in parallel/series as unit cells. Each of the unit cells includes an electrode assembly having a positive electrode and a negative electrode with a separator positioned therebetween, a case having a space to receive the electrode assembly therein, a cap assembly coupled to the case and sealing the case, and positive and negative terminals protruding from the cap assembly and electrically connected to positive and negative current collectors provided in the electrode assembly.

In some instances, each of the unit cells has a membrane and a fuse installed to be electrically connected to the positive electrode terminal. The membrane makes contact with the negative electrode terminal when the internal pressure of the case increases due to overcharge of the unit cell, and creates short circuit between the positive and negative electrodes. When short circuit is created, the fuse is cut off, thereby blocking an electrical connection of the unit cell.

As the number of secondary batteries included in a battery module increases, the number of membranes and fuses to be installed also increase, thereby increasing a probability of malfunction of an overcharge preventing safety device. Even during normal operation, most of the unit cells included in the secondary battery module may be unavoidably damaged.

SUMMARY

Aspects of embodiments of the present invention are directed to a secondary battery module, which can reduce a probability of malfunction of an overcharge preventing safety device and can save the manufacturing cost by minimizing the number of components used in the secondary battery module.

In accordance with one embodiment of the present invention, a secondary battery module includes a plurality of secondary battery units each including at least one secondary battery, each secondary battery including an electrode assembly, a case accommodating the electrode assembly, and first and second electrode terminals electrically connected to the electrode assembly, wherein for at least the first secondary battery unit of the plurality of secondary battery units, each of the corresponding at least one secondary batteries further includes a short-circuit member electrically connected to the corresponding first electrode terminal and protruding to the outside of the corresponding case upon the internal pressure of the case reaching a high-pressure condition; at least one fuse connecting at least two of the plurality of secondary battery units to one another in series, and a short circuit connection member having a first side facing each of the short-circuit members of the at least one secondary battery of the first of the plurality of secondary battery units and a second side electrically connected to a second electrode terminal of a secondary battery of another of the plurality of secondary battery units.

The secondary battery module may further include a first connection member electrically connecting the first electrode terminals of the corresponding plurality of secondary batteries; and a second connection member electrically connecting the second electrode terminals of the corresponding plurality of secondary batteries.

The fuse may electrically connect the second connection member of the first secondary battery unit and a first connection member of another of the plurality of secondary battery units.

The fuse may have a smaller sectional area than the first connection members or the second connection members.

On the high-pressure condition, the short circuit member may be inverted to electrically contact the first side of the short circuit connection member.

When the short circuit connection member electrically contacts the short-circuit member, the current may be bypassed from the first secondary battery unit to the second electrode terminal of a secondary battery of the last secondary battery unit of the plurality of secondary battery units.

The first side of the short circuit connection member may include at least one protrusion that protrudes toward a short-circuit member.

As described above, the secondary battery module according to the present invention can reduce a probability of malfunction of an overcharge preventing safety device and can save the manufacturing cost by minimizing the number of components used in a secondary battery module.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, an exemplary embodiment of the invention will be described in detail with reference to the accompanying drawings. In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals generally designate like elements throughout the specification. Further, the use of "may" when describing embodiments of the present invention refers to "one or more embodiments of the present invention."

Figure 1:
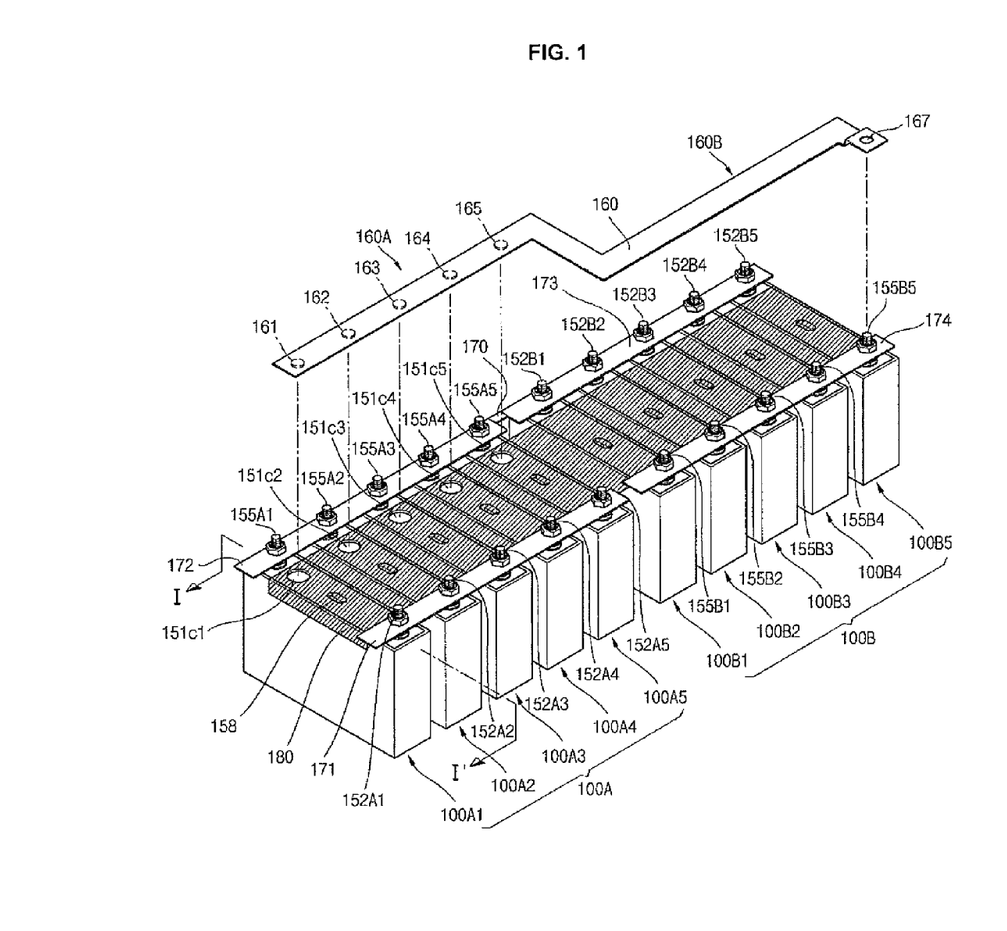
FIG. 1 is a perspective view of a secondary battery module according to an embodiment of the present invention.

FIG. 1 is a perspective view of a secondary battery module according to an embodiment of the present invention.

Referring to FIG. 1, the secondary battery module 100 according to an embodiment of the present invention includes a plurality of secondary battery units 100A and 100B, a first connection member 160, which serves as a short circuit connection member, and a fuse 170. In some embodiments, the secondary battery module 100 may further include second connection members 171 and 173, third connection members 172 and 174 and an insulation film 180.

The plurality of secondary battery units 100A and 100B may include a plurality of secondary batteries. For example, as shown in FIG. 1, the secondary battery units 100A and 100B may include a first secondary battery unit 100A and a second secondary battery unit 100B connected to each other in series. The first secondary battery unit 100A includes first to fifth secondary batteries 100A1, 100A2, 100A3, 100A4 and 100A5 connected to each other in parallel, and the second secondary battery unit 100B includes sixth to tenth secondary batteries 100B1, 100B2, 100B3, 100B4 and 100B5 connected to each other in parallel. However, the secondary battery module 100 according to the present invention is not limited to that with the aforementioned configuration. The number of secondary batteries connected to each other in parallel and the number of secondary battery units connected to each other in series may vary according to the specification of the secondary battery module.

In the secondary battery module 100 according to an embodiment of the present invention, the first secondary battery unit 100A may be defined as being positioned in the first place in a row of secondary battery units and the second secondary battery unit 100B may be defined as being positioned in the last place. In some embodiments, in the first secondary battery unit 100A, the first secondary battery 100A1 is defined as being positioned in the first place in a row of secondary batteries, and the fifth secondary battery 100A5 is defined as being positioned in the last place. In other words, the first to fifth secondary batteries are defined as being arranged sequentially from 100A1 to 100A2, 100A3, 100A4 and to 100A5 in that order. In some embodiments, in the second secondary battery unit 100B, the sixth secondary battery 100B1 is defined as being positioned in the first place in a row of secondary batteries, and the tenth secondary battery 100B5 is defined as being positioned in the last place. In other words, the sixth to tenth secondary batteries are defined as being arranged sequentially from 100B1 to 100B2, 100B3, 100B4 and to 100B5 in that order. For a better understanding of the present invention, the aforementioned arrangement order is defined according to the flow of the charge current of the secondary battery module 100.

The second connection members 171 and 173 and the third connection members 172 and 174 may connect the first to fifth secondary batteries 100A1, 100A2, 100A3, 100A4 and 100A5 to each other in parallel, and may connect the sixth to tenth secondary batteries 100B1, 100B2, 100B3, 100B4 and 100B5 to each other in parallel. The fuse 170 may connect the first secondary battery unit 100A and the second secondary battery unit 100B to each other in series, which will later be described in more detail.

Figure 2:
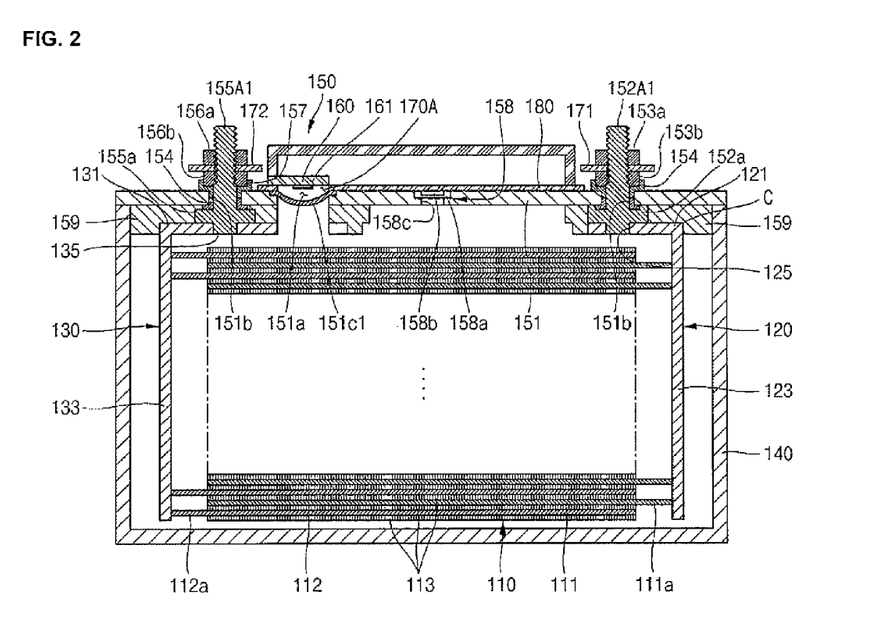
FIG. 2 is a cross-sectional view of the secondary battery module, taken along the line I-I' of FIG. 1.

FIG. 2 is a cross-sectional view of the secondary battery module, taken along the line of FIG. 1.

Since the first to tenth secondary batteries 100A1, 100A2, 100A3, 100A4, 100A5, 100B1, 100B2, 100B3, 100B4 and 100B5 have substantially the same configuration, only the first secondary battery 100A1 will be representatively described in detail in the following description. In one embodiment, the first to fifth secondary batteries 100A1, 100A2, 100A3, 100A4 and 100A5 have first to fifth short-circuit members 151$c$1, 151$c$2, 151$c$3, 151$c$4 and 151$c$5 formed therein, respectively. However, short-circuit members corresponding to the sixth to tenth secondary batteries 100B1, 100B2, 100B3, 100B4 and 100B5 may not be formed, which will later be described in more detail.

Referring to FIG. 2, the first secondary battery 100A1 according to an embodiment of the present invention may include an electrode assembly 110, a first current collector 120, a second current collector 130, a case 140 and a cap assembly 150.

The electrode assembly 110 may be formed by winding or laminating a stack of a first electrode plate 111, a separator 113 and a second electrode plate 112, which are all thin plates or layers. In one embodiment, the first electrode plate 111 may function as a positive electrode, and the second electrode plate 112 may function as a negative electrode.

The first electrode plate 111 may be formed by coating a first electrode active material, e.g., a transition metal oxide, on a first electrode made of a metal foil, e.g., aluminum foil. The first electrode plate 111 may include a first uncoated portion 111$a$ that is not coated with the first electrode active material. The first uncoated portion 111$a$ may correspond to a path of current flow between the first electrode plate 111 and the outside of the first electrode plate 111. However, the present invention is not limited to the material of the first electrode plate 111 listed herein.

The second electrode plate 112 may be formed by coating a second electrode active material, e.g., graphite or carbon, onto a second electrode made of a metal foil, e.g., nickel or copper. The second electrode plate 112 may include a second uncoated portion 112$a$ that is not coated with the second active material. The second uncoated portion 112$a$ may correspond to a path of current flow between the second electrode plate 112 and the outside of the second electrode plate 112. However, the present invention is not limited to the material of the second electrode plate 112 listed herein.

The separator 113, located between the first and second electrode plates 111 and 112, may prevent short circuits between the first and second electrode plates 111 and 112, and may allow lithium ions to move. The separator 113 may be made of, e.g., polyethylene, polypropylene, or a composite film of polyethylene and polypropylene. However, the present invention is not limited to the material of the separator 113 listed herein.

The first current collector 120 and the second current collector 130 may be coupled to opposite ends of the electrode assembly 110 to be electrically connected to the first and second electrode plates 111 and 112, respectively.

The first current collector 120 may be formed of a conductive material, such as aluminum or an aluminum alloy and may be electrically connected to the first electrode plate 111 by contacting the first electrode uncoated portion 111$a$ protruding from one end of the electrode assembly 110. The first current collector 120 may include a first coupling part 121 and a first extension part 123. A first terminal hole 125 may be formed in the first coupling part 121. The first terminal hole 125 may provide a space into which a lower portion of a first electrode terminal 152A1 is inserted and coupled. The first extension part 123 is bent and extended from an end of the first coupling part 121 and is generally shaped as a plate substantially contacting the first electrode uncoated portion 111a. Assuming that a corner at which the first coupling part 121 and the first extension part 123 meet is denoted by 'C', the first coupling part 121 and the first extension part 123 may be substantially perpendicular to each other at the corner C.

The second current collector 130 may be formed of a conductive material, such as copper, a copper alloy, nickel or a nickel alloy, and may be electrically connected to the second electrode plate 112 by contacting the second electrode uncoated portion 112a protruding from the other end of the electrode assembly 110. The second current collector 130 may include a second coupling part 131 and a second extension part 133. A second terminal hole 135 may be formed in the second coupling part 131. The second terminal hole 135 may provide a space into which a second electrode terminal 155A1 is inserted and coupled. The second extension part 133 is bent and extended from an end of the second coupling part 131 and is generally shaped as a plate substantially contacting the second electrode uncoated portion 112a. Assuming that a corner at which the second coupling part 131 and the second extension part 133 meet is denoted by 'C', the second coupling part 131 and the second extension part 133 may be substantially perpendicular to each other at the corner C.

The case 140 may be formed of a conductive metal, such as aluminum, an aluminum alloy or a nickel plated steel, may have an approximately hexahedron shape, and may have a case opening through which the electrode assembly 110, the first current collector 120 and the second current collector 130 are inserted and placed. Since the case 140 and the cap assembly 150 are illustrated in an assembled state in FIGS. 1 and 2, the case opening is not shown. However, it is to be understood that the case opening corresponds to a substantially opened portion of the edge of the cap assembly 150. The inner surface of the case 140 may be insulated from the electrode assembly 110, the first and second current collectors 120 and 130 and the cap assembly 150. In one embodiment, the case 140 may be electrically connected to the first electrode terminal 152A1 and may function as a positive electrode, for example.

The cap assembly 150 may be coupled to the case 140. In one embodiment, the cap assembly 150 may be coupled to the case 140 at the opening of the case 140. The cap assembly 150 may include a cap plate 151, a first electrode terminal 152A1, first nuts 153a and 153b, a first gasket 154, a second electrode terminal 155A1, second nuts 156a and 156b, a second gasket 157, a safety vent 158 and an insulator 159.

The cap plate 151 may be coupled to the case 140 at the opening of the case 140 and may close the opening of the case 140. A short circuit hole 151a, terminal holes 151b, a first short circuit member 151c1 and a safety vent 158 may be formed in the cap plate 151. In one embodiment, the terminal holes 151b may be formed at both sides of the cap plate 151, relative to the center of the cap plate 151. In one embodiment, the cap plate 151 may be formed of the same material as that of the case 140 and may have the same polarity as that of the case 140.

In one embodiment, the first short circuit member 151c1 is installed in the short circuit hole 151a of the cap plate 151 and has the same polarity as that of the cap plate 151. The first short circuit member 151c1 may include an inversion plate having a downwardly convex round part, and an edge part fixed to the first short circuit hole 151a. In one embodiment, a peripheral part of the short circuit hole 151a is formed stepwise, and the edge part of the first short circuit member 151c1 is placed in the stepped peripheral part of the short circuit hole 151a to then be coupled to the cap plate 151 by, for example, welding. When the internal pressure of the first secondary battery 100A1 exceeds a preset pressure, the first short circuit member 151c1 may be inverted to then upwardly convexly protrude. The first short circuit member 151c1 may be formed in each of the first to fifth secondary batteries 100A1, 100A2, 100A3, 100A4 and 100A5. In one embodiment, the first short circuit member 151c1 is preferably formed only in the first secondary battery 100A1 positioned in the first place among the plurality of secondary battery units.

First nuts 153a and 153b include a first upper nut 153a and a first lower nut 153b, which are fastened along the screw thread formed on the first electrode terminal 152A1, thereby fixing the first electrode terminal 152A1 to the cap plate 151.

The first gasket 154 may be formed of an insulating material and may be located between the first electrode terminal 152A1 and the cap plate 151 to seal a space between the first electrode terminal 152A1 and the cap plate 151. The first gasket 154 may prevent the introduction of moisture into the first secondary battery 100A1 or the leakage of the electrolyte from the first secondary battery 100A1.

The second electrode terminal 155A1 may pass through the terminal hole 151b formed at the side of the cap plate 151 opposite to the side of the cap plate 151 at which the first electrode terminal 152A1 is formed, and may be electrically connected to the second current collector 130. The second electrode terminal 155A1 may be generally shaped as a pillar. A screw thread is formed at the outer circumferential edge of an upper pillar of the second electrode terminal 155A1 protruding from an upper portion of the cap plate 151, and a flange 155a is formed at a lower pillar of the second electrode terminal 155A1 positioned at the lower portion of the cap plate 151 to prevent the second electrode terminal 155A1 from being dislodged from the cap plate 151. In the second electrode terminal 155A1, a portion of the lower pillar positioned at the lower portion of the cap plate 151 may be fitted into the terminal hole 135 of the second current collector 130. The second electrode terminal 155A1 may be electrically insulated from the cap plate 151.

Second nuts 156a and 156b include a second upper nut 156a and a second lower nut 156b, which are fastened along the screw thread formed on the second electrode terminal 155A1, thereby fixing the second electrode terminal 155A1 to the cap plate 151.

The second gasket 157 may be formed of an insulating material and may be located between the second electrode terminal 155A1 and the cap plate 151 to seal a space between the second electrode terminal 155A1 and the cap plate 151. The second gasket 157 may prevent the introduction of moisture into the first secondary battery 100A1 or the leakage of the electrolyte from the first secondary battery 100A1.

The safety vent 158 may be formed in a vent hole 158c of the cap plate 151 and may include a vent plate 158a. The vent plate 158a may have a notch 158b configured to be opened when the internal pressure of the case 140 increases. In one embodiment, when the internal pressure of the case 140 exceeds a preset pressure, the vent plate 158a is ruptured along the notch 158b, and the ruptured part of the vent plate 158a comes to face the top portion of the cap plate 151.

The insulator 159 may be installed between each of the first and second current collectors 120 and 130 and the cap plate 151 to prevent unnecessary short circuiting.

In some embodiments, one side 160A of the first connection member 160 faces the first to fifth short-circuit members 151c1, 151c2, 151c3, 151c4 and 151c5 of the first to fifth secondary batteries 100A1, 100A2, 100A3, 100A4 and 100A5, and the other side 160B of the first connection member 160 may be electrically connected to the second electrode terminal 155B5 of the tenth secondary battery 100B5 positioned in the last place in the second secondary battery unit 100B. In one embodiment, first to fifth protrusions 161, 162, 163, 164 and 165 may be formed at the one side 160A of the first connection member 160, the first to fifth protrusions 161, 162, 163, 164 and 165 positioned on the first to fifth secondary batteries 100A1, 100A2, 100A3, 100A4 and 100A5, facing the first to fifth short-circuit members 151c1, 151c2, 151c3, 151c4 and 151c5, respectively, and protruding toward the first to fifth short-circuit members 151c1, 151c2, 151c3, 151c4 and 151c5. A terminal hole 167 may be formed at the other side 160B of the first connection member 160. In one embodiment, a top portion of the second electrode terminal 155B5 of the tenth secondary battery 100B5 is inserted into the terminal hole 167, and the second upper nut 156a is fastened with the terminal hole 167, thereby electrically connecting the other side 160B of the first connection member 160 to the second electrode terminal 155B5 of the tenth secondary battery 100B5.

The insulation film 180 may cover a top surface of each of the first to tenth secondary batteries 100A1, 100A2, 100A3, 100A4, 100A5, 100B9, 100B2, 100B3, 100B4 and 100B5. For example, the insulation film 180 may cover the top surfaces of the first to tenth secondary batteries 100A1, 100A2, 100A3, 100A4, 100A5, 100B1, 100B2, 100B3, 100B4 and 100B5, except for portions of the top surfaces where electrode terminals 152A1 to 152A5, 155A1 to 155A5, 152B1 to 151B5, and 155B1 to 155B5 are respectively positioned. In some embodiments, the insulation film 180 may cover the first secondary battery 100A1 and a portion of the lateral surface of the tenth secondary battery 100B5 to be more firmly fixed to the top portion of the secondary battery module 100. In addition, a plurality of opening holes 180A facing the first to fifth short-circuit members 151c1, 151c2, 151c3, 151c4 and 151c5 may be formed in the insulation film 180. A top portion of the first short-circuit member 151c1 may be aligned with the opening holes 180A and may be opened by the opening holes 180A. In one embodiment, the first connection member 160 is positioned on the insulation film 180, thereby preventing unnecessary short circuiting between the first connection member 160 and the case 140. The insulation film 180 is preferably formed with an appropriate thickness, enough to be able to tear when the safety vent 158 is ruptured, and is preferably made of a material having appropriate heat resistance to prevent the insulation film 180 from melting when the surface temperature of the battery rises.

As illustrated in FIG. 1, the second connection members 171 and 173 may include a second-first connection member 171 and a second-second connection member 173, and the third connection members 172 and 174 may include a third-first connection member 172 and a third-second connection member 174. However, number of the second and third connection members 171, 172, 173 and 174 may vary according to the number of secondary battery units to be installed.

The second-first connection member 171 may electrically connect the first electrode terminals 152A1, 152A2, 152A3, 152A4 and 152A5 of the first to fifth secondary batteries 100A1, 100A2, 100A3, 100A4 and 100A5 to each other. The third-first connection member 172 may electrically connect the second electrode terminals 155A1, 155A2, 155A3, 155A4 and 155A5 of the first to fifth secondary batteries 100A1, 100A2, 100A3, 100A4 and 100A5 to each other. Accordingly, the second-first and third-first connection members 171 and 172 may connect the first to fifth secondary batteries 100A1, 100A2, 100A3, 100A4 and 100A5 to each other in parallel.

In some embodiments, the second-second connection member 173 may electrically connect the first electrode terminals 152B1, 152B2, 152B3, 152B4 and 152B5 of the sixth to tenth secondary batteries 100B1, 100B2, 100B3, 100B4 and 100B5 to each other. The third-second connection member 174 may electrically connect the second electrode terminals 155B1, 155B2, 155B3, 155B4 and 155B5 of the sixth to tenth secondary batteries 100B1, 100B2, 100B3, 100B4 and 100B5 to each other. Accordingly, the second-second and third-second connection members 173 and 174 may connect the sixth to tenth secondary batteries 100B1, 100B2, 100B3, 100B4 and 100B5 to each other in parallel.

The fuse 170 may electrically connect the third-first connection member 172 of the first secondary battery unit 100A to the second-second connection member 173 of the second secondary battery unit 100B. The fuse 170 has a smaller sectional area than the third-first connection member 172 or the second-second connection member 173, and may be made of a material having a lower melting point than the first to fifth short-circuit members 151c1, 151c2, 151c3, 151c4 and 151c5.

Figure 3:
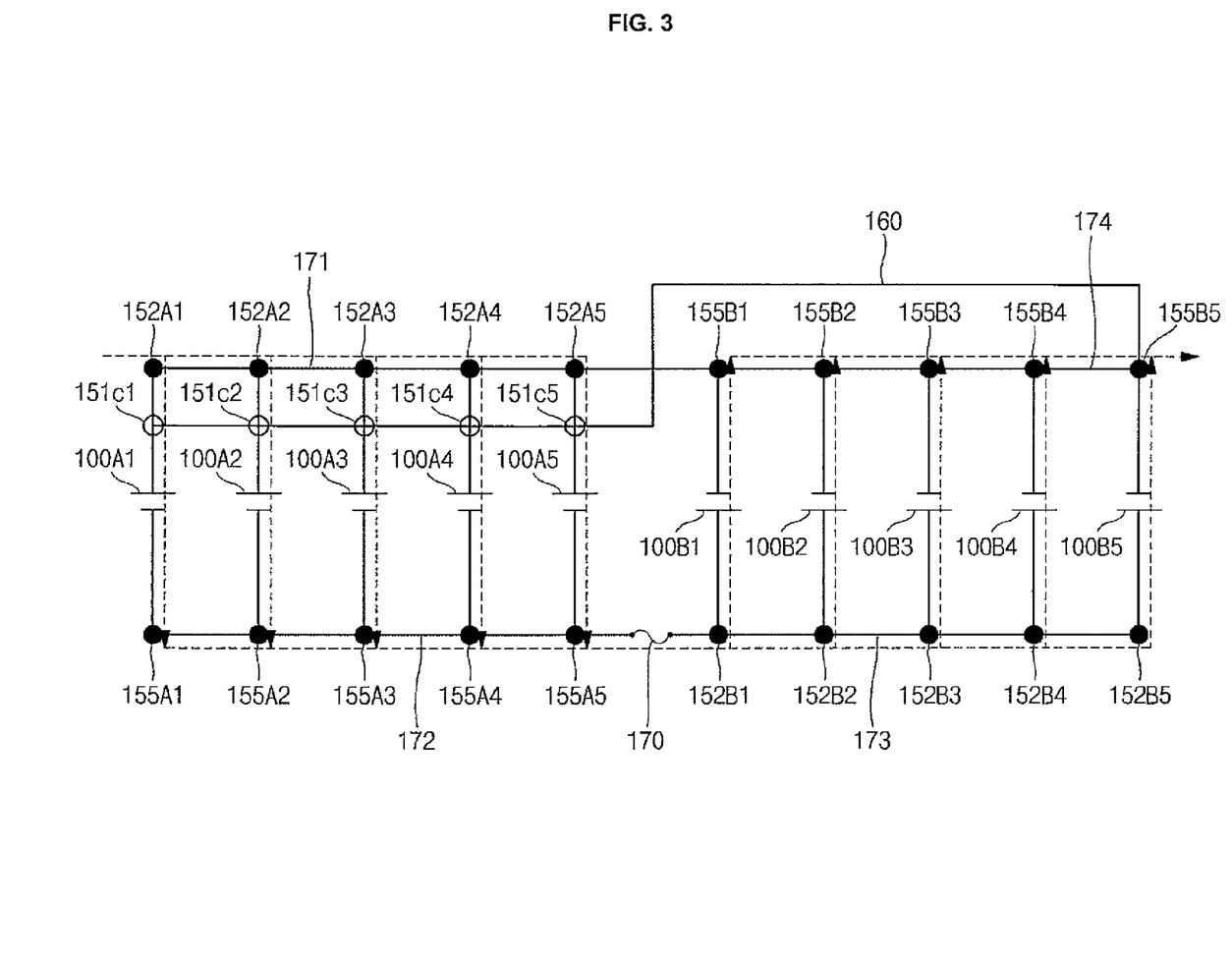
FIG. 3 is a circuit view illustrating the flow of current during a normal charge operation of the secondary battery module shown in FIG. 1.

FIG. 3 is a circuit view illustrating the flow of current during a normal charge operation of the secondary battery module shown in FIG. 1.

As illustrated in FIG. 3, a charge current of the secondary battery module 100 is applied to the second-first connection member 171 of the first secondary battery unit 100A. Then, the charge current passes through the first electrode terminals 152A1, 152A2, 152A3, 152A4 and 152A5 of the first to fifth secondary batteries 100A1, 100A2, 100A3, 100A4 and 100A5, the electrode assembly 110, the second electrode terminals 155A1, 155A2, 155A3, 155A4 and 155A5, and flows to the second secondary battery unit 100B through the third-first connection member 172. In one embodiment, the charge current output from the third-first connection member 172 of the first secondary battery unit 100A may be applied to the second-second connection member 173 of the second secondary battery unit 100B through the fuse 170. The charge current applied to the second-second connection member 173 of the second secondary battery unit 100B may pass through the first electrode terminals 152B1, 152B2, 152B3, 152B4, 152B5 of the sixth to tenth secondary batteries 100B1, 100B2, 100B3, 100B4 and 100B5, the electrode assembly 110, and the second electrode terminals 155B1, 155B2, 155B3, 155B4 and 155B5 and may then be output through the third-second connection member 174.

Figure 4:
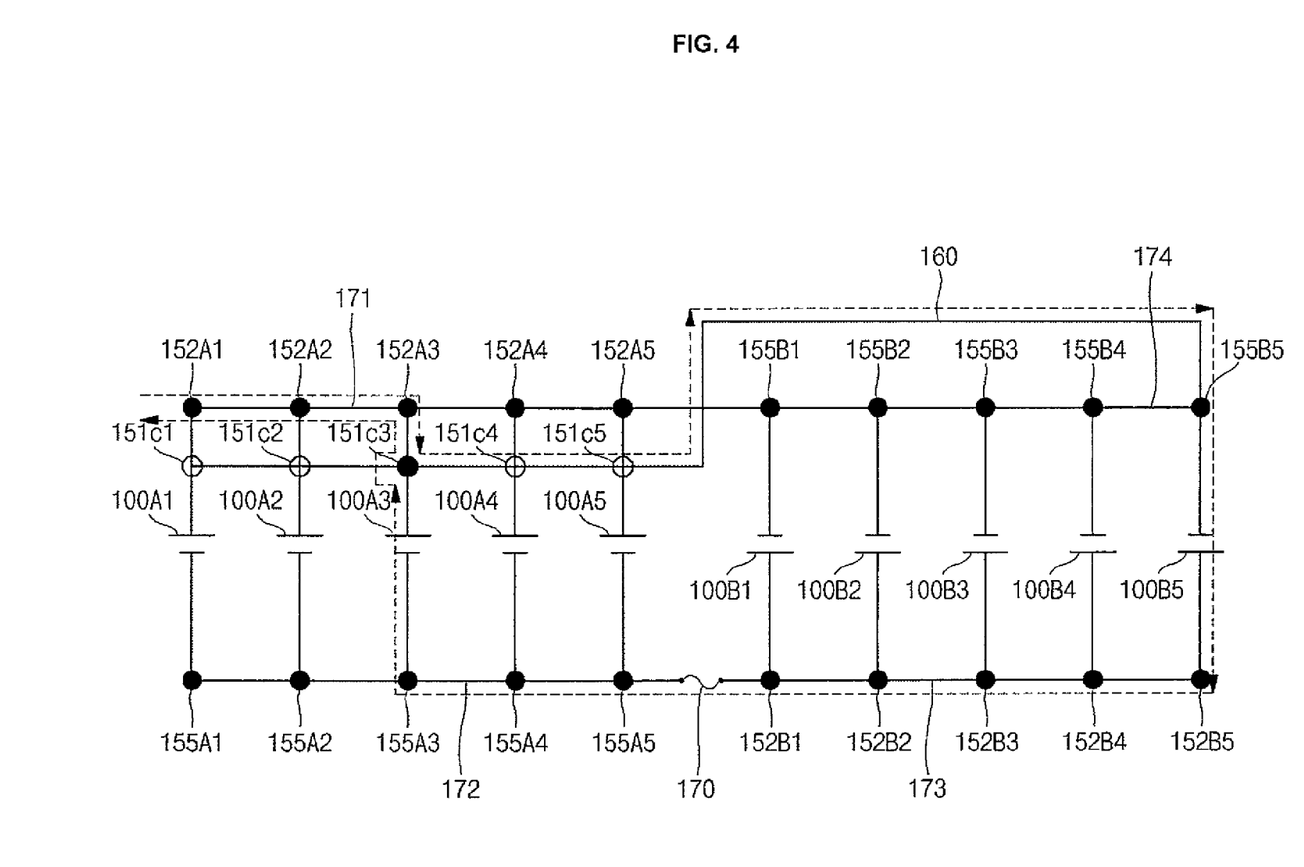
FIGS. 4 and 5 are circuit views illustrating operation mechanism during an overcharge of a secondary battery module according to an embodiment of the present invention.
Figure 5:
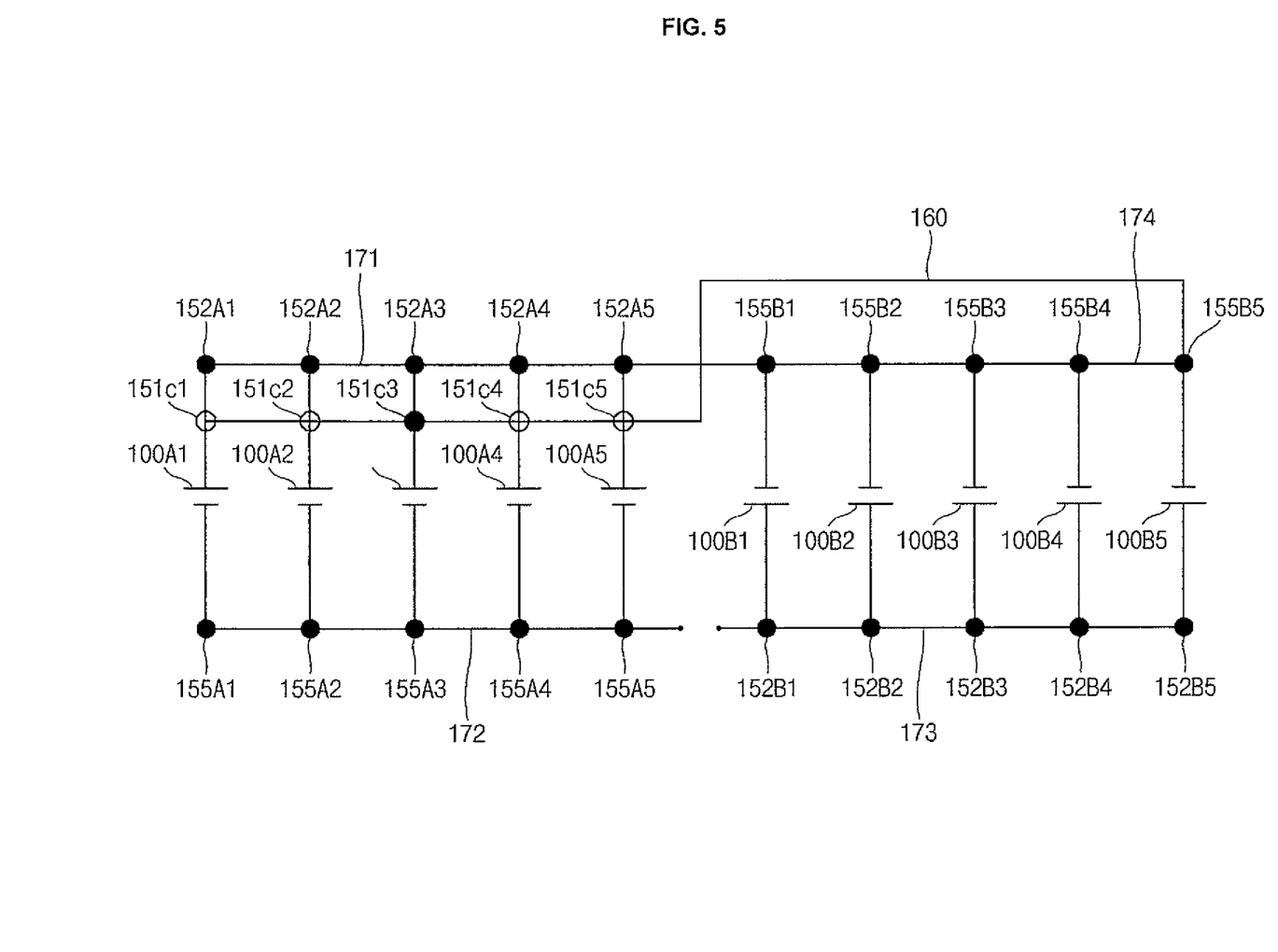

FIGS. 4 and 5 are circuit views illustrating operation mechanism during an overcharge of a secondary battery module 100 according to an embodiment of the present invention.

In one embodiment, when the internal pressure inside the case 140 of each of the first to tenth secondary batteries 100A1 to 100B5 exceeds a preset pressure due to overcharge of the secondary battery module 100, at least one of the first to fifth short-circuit members 151c1 to 151c5 of the first secondary battery unit 100A may be inverted to upwardly protrude. When this occurs, at least one of the first to fifth protrusions 161, 162, 163, 164 and 165 may electrically contact the upwardly protruding short-circuit member. In the embodiment illustrated in FIGS. 4 and 5, it is assumed that when the secondary battery module 100 is overcharged, the third short-circuit member 151c3 of the third secondary battery 100A3 protrudes to contact the third protrusion 163 of the first connection member 160.

In the illustrated embodiment, the third short-circuit member 151c3 is electrically connected to the case 140, which in turn is electrically connected to a positive electrode, and the first connection member 160 is connected to the second electrode terminal 155B5 of a negative electrode. Thus, when the third short-circuit member 151c3 and the third protrusion 163 on the first connection member 160 contact each other, the secondary battery module 100 may be short circuited.

As illustrated in FIG. 4, an overcharge current of the secondary battery module 100 is applied to the second-first connection member 171 of the first secondary battery unit 100A, passes through the first electrode terminal 152A3 of the third secondary battery 100A3, the case 140, the third short-circuit member 151c3, the first connection member 160, the second electrode terminal 155B5 of the tenth secondary battery 100B5, the electrode assembly 110, the first electrode terminal 152B5, the second-second connection member 173, the fuse 170 and the third-first connection member 172, the second electrode terminal 155A3 of the third secondary battery 100A3, the electrode assembly 110 and the first electrode terminal 152A3 of the third secondary battery 100A3, and then flows to the outside through the second-first connection member 171. In some embodiments, when the overcharge current flows across a circuit constituted by the secondary battery module 100, the fuse 170 installed on the circuit may be melted by the heat generated due to the overcharge current and may cut off the current. Accordingly, as illustrated in FIG. 5, an electrical connection of the secondary battery module 100 may be blocked.

In the secondary battery module according to the embodiment of the present invention, a plurality of secondary battery units each including a plurality of secondary batteries connected to each other in parallel are connected to each other in series. The secondary battery unit positioned in the first place among the plurality of secondary battery units includes a positive electrode short-circuit member and a connection member facing the short-circuit member. The connection member is electrically connected to a negative electrode terminal of the last secondary battery in the secondary battery unit positioned in the last place among the plurality of secondary battery units, and fuses are provided between each of the respective secondary battery units. During overcharge, the overcharge current is bypassed from the first secondary battery unit to the last secondary battery unit, thereby preventing the overcharge current from flowing through the secondary battery and minimizing damages of the secondary battery.

In some embodiments, a safety operation against overcharge can be successfully performed by installing the fuse only at a connection part between each of the secondary battery units. In other words, it is not necessary to install the fuse for each secondary battery unit. In addition, during overcharge, even when the short-circuit member is installed only at the secondary battery unit arranged in the first place, an overcharge preventing operation can be successfully performed by making an overcharge current bypass through the first connection member. Accordingly, the number of components of the secondary battery module can be minimized, thereby reducing the manufacturing cost of the secondary battery module. In addition, since the number of components, such as the short-circuit member, the fuse, or the like, is reduced, a probability of malfunction of an overcharge preventing safety device due to malfunctioning of each of the individual components can be reduced.

Although the secondary battery module according to an exemplary embodiment of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims and equivalents thereof.

What is claimed is:

1. A secondary battery module comprising:
   a plurality of secondary battery units comprising a first secondary battery unit and a last secondary battery unit, each of the plurality of secondary battery units comprising at least one secondary battery, each secondary battery comprising an electrode assembly, a case accommodating the electrode assembly, and first and second electrode terminals electrically connected to the electrode assembly, wherein for only the first secondary battery unit of the plurality of secondary battery units, each of the corresponding at least one secondary batteries further comprises a short-circuit member electrically connected to the corresponding first electrode terminal and protruding to the outside of the corresponding case upon the internal pressure of the case reaching a high-pressure condition;
   at least one fuse connecting at least two of the plurality of secondary battery units to one another in series; and
   a short circuit connection member having a first side facing each of the short-circuit members of the at least one secondary battery of the first secondary battery unit and a second side electrically connected to the second electrode terminal of a secondary battery of the last secondary battery unit of the plurality of secondary battery units.

2. The secondary battery module of claim 1, wherein each secondary battery unit further comprises a plurality of secondary batteries, and each secondary battery unit further comprises:
   a first connection member electrically connecting the first electrode terminals of the corresponding plurality of secondary batteries; and
   a second connection member electrically connecting the second electrode terminals of the corresponding plurality of secondary batteries.

3. The secondary battery module of claim 2, wherein the fuse electrically connects the second connection member of the first secondary battery unit and a first connection member of another of the plurality of secondary battery units.

4. The secondary battery module of claim 3, wherein the fuse has a smaller sectional area than the first connection members or the second connection members.

5. The secondary battery module of claim 1, wherein on the high-pressure condition, the short circuit member is inverted to electrically contact the first side of the short circuit connection member.

6. The secondary battery module of claim 5, wherein when the short circuit connection member electrically contacts the short-circuit member, the current is bypassed from the first secondary battery unit to the second electrode terminal of the secondary battery of the last secondary battery unit of the plurality of secondary battery units.

7. The secondary battery module of claim 1, wherein the first side of the short circuit connection member includes at least one protrusion that protrudes toward the short-circuit member.

\* \* \* \* \*